June 12, 1928.
F. E. PERNOT ET AL
1,672,989
LOADING SUBMARINE CABLES
Filed Feb. 19, 1923    3 Sheets-Sheet 1
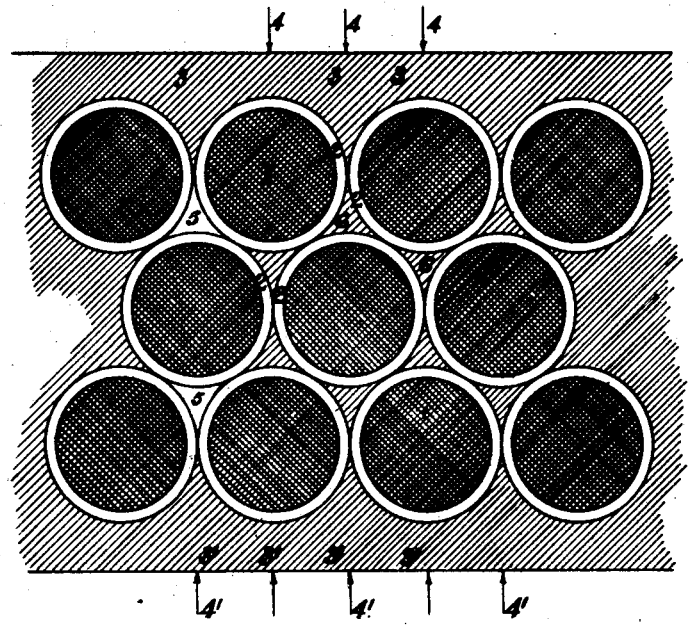
FIG: 1.
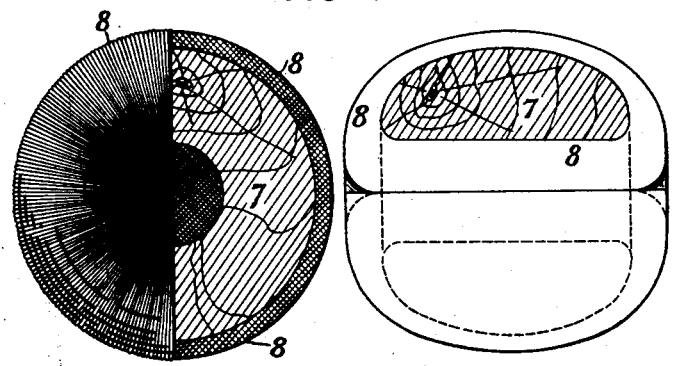
FIG: 2.    FIG: 3.

June 12, 1928.						1,672,989
F. E. PERNOT ET AL
LOADING SUBMARINE CABLES
Filed Feb. 19, 1923		3 Sheets-Sheet 2
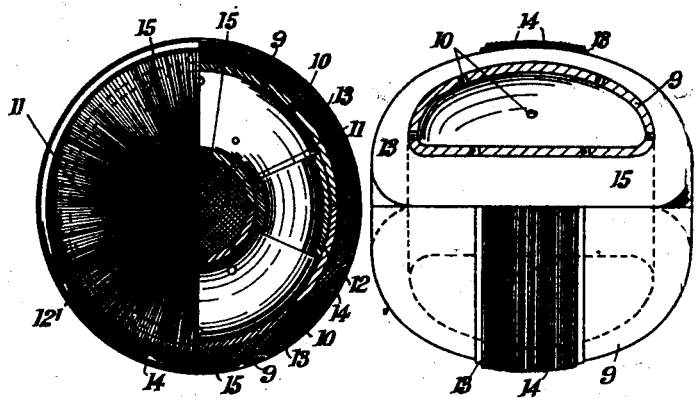
FIG: 4.            FIG: 5.
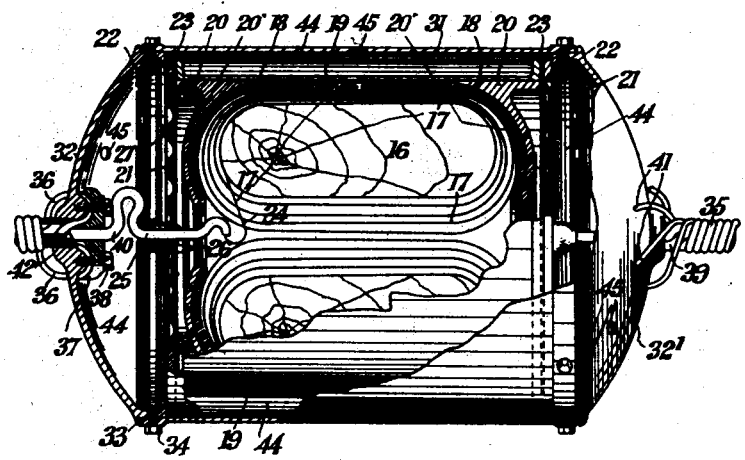
FIG: 6.
Inventors:-
Frederick Eugene Pernot
Lester Jacob Rich.
By John S. Barker
Atty June 12, 1928.

F. E. PERNOT ET AL 1,672,989

LOADING SUBMARINE CABLES

Filed Feb. 19, 1923

Patented June 12, 1928.

1,672,989

UNITED STATES PATENT OFFICE.

FREDERICK EUGENE PERNOT AND LESTER JACOB RICH, OF LONDON, ENGLAND.

LOADING SUBMARINE CABLES.

Application filed February 19, 1923, Serial No. 619,976, and in Great Britain February 23, 1922.

This invention relates to new or improved methods for loading submarine cables and has particular reference to the design of lumped or concentrated (in contradistinction to uniformly distributed) inductances for effecting such loading.

It has long been known in the art that an improvement in the performance of signalling cables can be effected by inserting inductances either in series with the cable conductor or in shunt from the cable conductor to earth, the size of the inductance and the frequency of insertion along the cable being determined by the effects desired in a manner well known in the art.

Prior to this invention considerable difficulty has been experienced in constructing loading coils for cables capable of withstanding submersion to the great depth at which submarine cables are laid, and the principal object of the present invention consists in the provision of means for overcoming such difficulty.

A further object of the invention is to provide an inductive loading coil which will not be affected by the presence of metal, as for example the container in which the coil is mounted, in its vicinity, and which will not be affected by external magnetic fields.

The principal feature of the present invention consists in the provision in an inductive loading of means whereby the hydrostatic pressure is communicated equally to all parts of the loading so that no force exists acting to change the shape of its structure.

Another feature of the invention consists in the provision of inductance elements or coils of toroidal shape so that external metal bodies or external magnetic fields can exert no appreciable influence upon the electrical characteristics of the loading unit.

A further feature of the invention resides in the shape of the toroidal coil, which will be hereinafter described with reference to the accompanying drawings, and which is selected in such a way as to result in the greatest efficiency.

Subsidiary features of the invention are found in the means for protecting the coil or load from mechanical injury during laying and handling, in the method for connecting the complete loading element to the cable, and in the means for preventing sharp bends in the cable at the point of attachment to the loading unit.

In order that the invention may be more fully understood reference will now be made to the accompanying drawings wherein:—

Fig. 1 shows a portion of the cross section of a coil and is adapted to demonstrate the physical principles involved.

Fig. 2 is an end view part sectional of a suitable toroidal loading coil for use in connection with this invention, and Fig. 3 is a side elevation part sectional thereof.

Fig. 4 is an end view part sectional of a modified form of toroidal coil suitable for use in connection with the present invention, and Fig. 5 is a side elevation thereof, in section.

Fig. 6 is adapted to illustrate one complete embodiment of the present invention.

Figure 7:
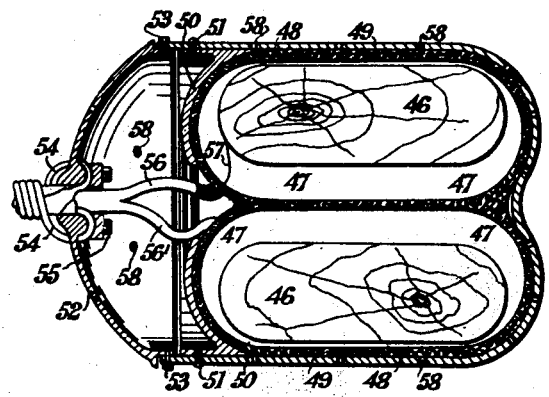
Fig. 7 is a modified embodiment of the present invention.

Before taking up the various features of the invention we will first consider the fundamental difficulty which it is the principal purpose of the invention to overcome.

Figure 1 shows a cross sectional view of a coil winding. At 1 is a particular wire in the winding, and 2 represents its surrounding insulation, usually cotton, silk, or the like. Suppose this winding to be enclosed between impermeable layers 3 and 3' of any material such as gutta percha, caoutchouc, etc. When immersed the hydrostatic pressure creates equal and opposing forces represented by the arrows 4, 4, 4, and 4', 4', 4', which are balanced as far as the entire structure is concerned. These forces act to compress the coil, and at great depths of submersion become great enough to force the metallic wires together, squeezing the insulation into the vacancies that may exist between the coils, such as indicated at 5. The coil is thus damaged, and if completely short-circuited the turns in the winding fail to perform their function.

If, however, the material 3, 3' be a fluid so that it can permeate the entire structure, filling the interstices, as indicated at 6, then the pressure is uniform on all portions of each individual wire, and each wire is in a state of equilibrium. No distorting forces exist, and the coil can endure submersion to any depth whatever without injury.

Similar equalization of forces on each wire can be secured by having the material employed to fill the interstices, as at 6, of some substantially or sensibly incompressible material, the entire coil being thoroughly impregnated with such material. The outer covering 3 and 3' may consist of this same material, or of any suitable impermeable material applied after the formation and impregnation of the coil.

If the material 3, 3, 3', 3', employed as an impermeable coating for the coils and adapted to impregnate the same and fill the interstices, as at 6, consists of a fluid, the neutralization of forces upon each wire is most complete, however, but since the internal adjustments of hydrostatic pressure take place during the time that the coil is sinking from the surface to the bottom of the sea, no harm results if the fluid hardens or sets subsequent to the laying process. In fact, the most desirable condition in practical use would be that in which such hardening did take place, becoming complete after the lapse of several years. If ever brought to the surface after the hardening of the liquid the coil would probably be unfit for laying again, but in practice this is an unimportant matter.

To illustrate the actions which have to be guarded against, experience encountered in deep sea dredging may be cited. Wooden parts of the dredging equipment say five inches square when brought to the surface after submersion to a depth of two thousand fathoms show knots extending across the grain to be projecting by $\frac{1}{4}$ to $\frac{3}{4}$ inch, thus indicating that since the water could not permeate all the pores of the wood, the wooden member was compressed by the above amount, but the knots were not compressed along their grain and hence were left sticking out by the amount which the wood was compressed. At a depth of 4 miles (21,120 feet) the pressure is 9400 lbs. per square inch, approximately, or 600 tons per square foot. Obviously, such a force must not be opposed, but must be made to neutralize itself.

The thing which makes such self-neutralization of pressure effects possible is the incompressibility, practically speaking, of fluids. Under the above pressure they vary slightly in volume, but not so much but what a sealed tank completely filled with such fluid can readily change in volume sufficiently to communicate the full pressure to the contained fluid.

Figures 2 and 3 are projection drawings of a simple toroidal coil. An annular ring 7 constitutes the core on which the winding is placed. Preferably this core is of impregnated wood, gutta percha, vitrified clay or stone. If the requirements of the situation demand a very great inductance the core may be made to contain iron also, in the form of wire, laminations or finely subdivided iron worked into the core. For some reasons it is highly desirable that no iron be associated with the loading, however, and one of the advantages presented by the invention is that it provides a safe way of handling the comparatively large coils necessary to furnish the required inductance without the use of iron. The winding of wire or strip is placed around and through the annular core as at 8, care being exercised to distribute the winding as evenly as possible all around the core. When perfectly uniform in its distribution, such a coil is not in the least affected by surrounding conditions; it produces no external magnetic field and hence is not affected by any externally produced magnetic field. Such a coil can be mounted in a close fitting metal container without having its properties affected thereby, a thing impossible with the ordinary rectangular coil. Slight departures from perfectly uniform distribution of the winding necessarily resulting in manufacture are not sufficiently serious to be of consequence. Some difficulty attaches to winding a complete closed ring, so that as an alternative the ring may be split in two and each half wound separately, the two windings finally being placed together to form a complete toroidal winding. The process of subdivision may be carried still further, the final coil consisting of a number of sections, but the result is always the same, namely, a complete toroidal winding free from external influences.

Figures 4 and 5 show an alternative coil design. The difference is mainly in the core construction. The core 9 is made hollow and contains a number of holes 10 communicating with the interior, so that any fluid in which the coil may subsequently be mounted can penetrate the core 9 and thus neutralize the compressive force on the core as a whole. In the design the coil is made up in two parts, separation being along the line 11. When put together the two halves are held in alignment by the two members 12 and 12' fitted inside the hollow core, acting in the same fashion as steady pins, and the whole coil is held together by banding wires 14 placed over a strip of protecting material 13, similar to the banding wires placed on the ends of armature coils in dynamos. The coil winding is at 15.

Figure 6 shows a complete embodiment of the invention. As shown it is connected in series in a cable, constituting both the electrical connection between the two parts of the cable as well as the mechanical connection. The core of the coil is at 16, and the winding of the coil is at 17. Surrounding the coil is a protective layer 18 of suitable insulating material. This layer of insulation serves to protect the coil from the metal members which hold the coil in place. The coil and its covering fit snugly within the cylindrical wall 19 of a metal tank (termed the inner tank) and is held in place longitudinally by the two annular shelves or supports 20 and 20'. Holes 20" as shown in the drawing allow the fluid contained within the inner tank to flow in and around the coil covering 18. The ends of the inner tank are closed by flexible metal heads 21 and 21', wherein flexibility is conveniently secured by concentric corrugations, like the aneroid barometer vacuum disk. These heads may be bolted, riveted, or welded to the side wall of the tank or fastened in any other approved manner. The annular rings 22 and 22' serve to strengthen the tank and hold the shelves 20 and 20' in place and prevent the weight carried by them from damaging the joints 23 and 23' between the tank heads and the side wall.

Both ends are alike, so we may now refer to only one end of the loading element.

Figure 9:
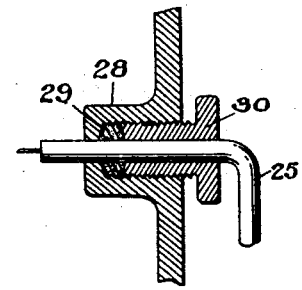
Fig. 9 shows a modified method of introducing the cable into the loading unit.

A terminal 24 of the coil is joined to the gutta percha or rubber or otherwise suitably covered conductor 25 and where this latter passes out through the tank head external and internal seals are provided as at 26. These seals may conveniently consist of gutta percha, rubber, Chatterton's compound, or other suitable material. Alternative to the seal here illustrated a type as shown in Figure 9 may be used. In Figure 9 the cable core 25 passes through an ordinary form of gland or stuffing box 28, with packing material 29 compressed by the screw member 30. The packing may consist of Chatterton's compound put in hot so that it amalgamates with the cable insulation, or other suitable material. Again with reference to Figure 6, a small hole with screw plug 27 may be provided for filling the inner tank with oil, tar, or other suitable fluid, preferably put in in a vacuum chamber so as to prevent inclusion of air in any portion of the inner tank. It is the complete filling of the volume within the inner tank with a sensibly incompressible fluid substance that renders the ensemble capable of withstanding the extreme pressures encountered in the depths of the ocean.

The inner tank containing the coil is now a complete unit which can be stored and kept ready to put into the outer tank and cable whenever necessary.

The outer tank consists of a cylindrical shell 31 closed at the ends by the heads 32 and 32', fastened to the side 31 by screw bolts 34 or other suitable fastenings. The inwardly projecting lip 33 of the head holds the inner tank in proper longitudinal position, while the close fit of the inner tank within the shell 31 prevents side-to-side movement of the former. The cable 35 enters the head at the hole 42 and the sheathing wire 36 is splayed out inside of the head and fastened by the clamping plate 37 with screw bolts or the like 38. The ends 36 of the sheathing wire may be carried out through small holes 41 in the head and spliced back into the cable or served on to the cable as shown at 39. The cable core 40 is carried out through a hole 43 in the clamp 37 and spliced in the usual manner to the piece of cable core 25 leading out from the inner tank.

Holes 45 in the outer tank allow the sea water ready access to all parts of the volume enclosed between inner and outer tanks, and hence allow the full hydrostatic pressure to be communicated to the flexible heads of the inner tank and thence to the fluid contents of the inner tank. Alternatively, the volume between inner and outer tanks may be filled with gutta percha, Chatterton's compound, tar, or other suitable material to act as a protective covering to the inner tank against corrosion or chemical action by the sea water. The hydrostatic pressure is still communicated to the inner tank, but through the medium of its protective covering.

The exposed piece of cable core 25 and 40 may be served with jute and a whipping of wire or metal tape to protect it against attack by certain organisms found in parts of the sea.

Leakage of fluid through the seal 26 does not take place because the pressure difference across the seal is sensibly zero, a result of the volume flexibility of the inner tank.

Figure 7 shows an alternative design suitable for use when a thoroughly impregnated coil is used. It is not to the same extent capable of withstanding extreme pressures as is the design in Figure 6, but for many applications is a sufficiently complete embodiment of the fundamental principles of the invention. Here, 46 is the core of the coil and 47 is the winding. The entire coil is thoroughly impregnated with a substantially incompressible material such as gutta percha (the volume elasticity of gutta percha, balata, vulcanized rubber, etc. is surprisingly small, although the materials are quite elastic or plastic in the ordinary sense) or the like which does not remain liquid after setting, and the whole is enclosed in an impermeable layer 48 of gutta percha, rubber, or the like.

The coil and its covering are then placed in a close fitting container 49 and held in place by the annular shelf 50 which in turn is attached to the container 49 by rivets or the like, 51. The head 52 which closes the container is attached by screw bolts 53 or the like. In the particular embodiment here shown the arrangement is adapted to a twin core cable, where both conductors are enclosed in a single sheathing. The sheathing 54 enters the head and is clamped by the clamp 55 in the same way as described in connection with Figure 6. The coverings of two cable cores 56 and 56' are joined to and made one with the covering 48 of the coil, so that the conductor 57 is totally enclosed and covered during its passage from the cable through the covering 48 to the coil. Holes 58 allow the water to enter and surround the impermeable coil covering so as to relieve the tank structure from any distortional stresses.

Figure 8:
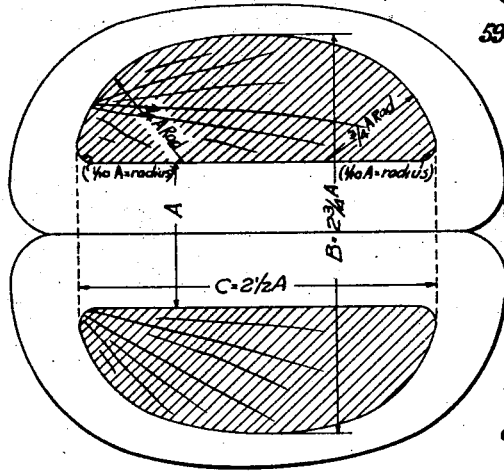
Fig. 8 illustrates a preferred method of attaching the cable to the loading unit in such a manner as to avoid sharp bends in the cable.

In Figure 8 is shown an alternative method of attaching the cable to the containing tank. The method here shown is adapted to prevent sharp bends in the cable at the point of attachment to the tank which are apt to occur in the process of laying when the rigid method of attachment shown in Figures 6 and 7 is used. In Figure 8, the portion of the tank to which the cable is attached is shown at 59. The cable 60 is attached to the ball portion 61 of a ball and socket joint by the clamp 62 and screw bolts 63. The ball 61 works in a socket 64 made in the tank-member 59, thus enabling the cable to enter the tank at a considerable angle without bending. The cable core 65 is led through a hole 66 in the clamp 62 and subsequently is taken to the loading coil in either of the methods described in connection with Figures 6 and 7. A metal hood, not shown in the drawing, may be placed around the rear portion of the ball to prevent its being pushed back into the tank when no tension is on the cable.

Figure 10:
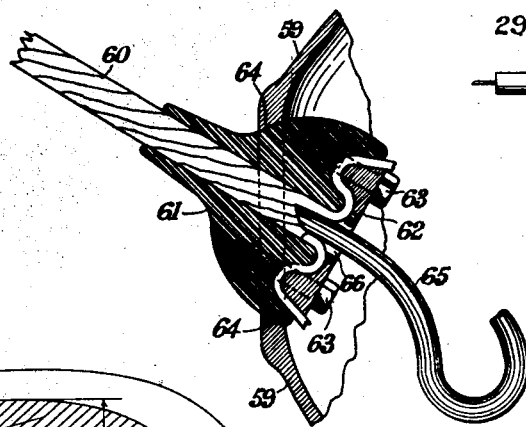
Fig. 10 is a side view, sectional, of a toroidal coil, showing the shape of toroid most effective for an inductance winding or coil.

The preferred shape for the toroidal coil is shown in Figure 10, because experiment has shown that such a shape gives a maximum inductance for a given weight and resistance. The principal dimensions are A, B and C as shown in the figure, and the best shape is expressed by two shape ratios for the core.

$$\frac{B}{A} = 2\tfrac{3}{4} \text{ and } \frac{C}{A} = 2\tfrac{1}{2}.$$

The winding is to be put on until the hole in the centre of the core is filled. The two subsidiary dimensions shown in the figure are not important, but when they are used in combination with the principal ones a formula for the inductance of the toroidal coil, wound full, is $$L = \frac{AN^2}{70,000,000} \text{ henrys,}$$

where

A = diameter of hole in inches.
N = number of turns.

Slight departures from the above principal shape ratios do not seriously affect the coil efficiency, but any great deviation will do so. The values given above may be subject to slight corrections, as a consequence of more refined experimental investigation, but the results so far obtained show them to be close to the truth.

We claim:

1. In a loaded submarine cable, lumped inductances and means for communicating the hydrostatic pressure to which the cable and inductances are subjected by reason of submersion equally to all parts of the inductances.

2. A lumped inductance for a loaded submarine cable with means for communicating the hydrostatic pressure due to the immersion of the cable and inductances equally to all parts of the inductance.

3. In a loaded submarine cable, lumped inductances, said inductances comprising inductance coils, said coils of toroidal configuration for rendering them immune from the effects of external metal bodies and magnetic fields, and means for communicating the hydrostatic pressure due to the submergence of the coils equally to all parts of the inductance structure.

4. A loaded sub-marine cable intended to be submerged in the sea to great depths, comprising lumped inductances and means for communicating the hydrostatic pressures to which the cable and inductances are subjected by reason of submersion equally to all parts of the inductances, such means including a material that is incompressible to any sensible degree and that impregnates the coils of the inductances.

5. In loads for submarine cables, inductance coils, connection from said coils to the cable, containers for said coils, said containers filled and the coils permeated, with a sensibly incompressible material and said containers being constructed to permit external pressure to be freely transmitted to the material.

6. In loads for submarine cables, inductance coils, container for said coils, a sensibly incompressible material filling said container, an outer tank, said tank accommodating said container and said container communicating all external pressure to said material.

7. In loads for submarine cables, an inductance coil, connection from said coil to the cable, a container for said coil, a sensibly incompressible material, said container filled with said material, an outer tank, said container accommodated within said tank, inlets in said tank, whereby the water within which the cable is submersed entering the tank through said inlets and said container communicating all external pressure to the material.

8. In loads for submarine cables a toroidal inductance coil, a core therefor, said core hollow, holes communicating from the interior to the exterior of said core, connection from the coil to the cable, a container accommodating said coil, a sensibly incompressible material filling said container and said container communicating all external pressure to the material.

9. In loads for submarine cables an inductance coil, connection from said coil to the cable, a container accommodating said coil, sensibly incompressible material filling said container, an outer tank, said container contained within said tank, the cable passing through said tank to the coil, a ball and socket point located in said tank, said cable passing through said joint and said container communicating all external pressure to the material.

10. In loads for submarine cables an inductance coil, a container therefor, flexible corrugated heads for said container, a cylindrical shell connecting said plates, annular shelves retaining said coil, insulation surrounding said coil, holes communicating from the interior to the exterior of said shelves, annular rings bearing against the exterior of each head, an outer tank, end members therefor, a cylindrical shell connecting said members, flanges formed on the interior of said tank, said container accommodated by said tank, the exterior faces of rings bearing against said flanges, the annular edge of said rings, head and shell of the container bearing against the interior face of the shell of the outer tank, filler holes for said container, holes in said tank, said holes communicating from the interior to the exterior thereof, the cable entering the head plates of said tank, the cable sheathing connected to said plates and said cable passing through the tanks to the coil.

11. In loads for submarine cables an inductance coil, a container therefor, sensibly incompressible material filling said container, said container communicating all external pressure to the coil, connection between the cable and coil, a ball member, the cable passing therethrough, a socket accommodating said ball, said socket allowing of movement of the ball, clamps for said ball, bolts for securing said clamps and said clamps securing the cable to the ball.

12. An inductance loading for submarine cables, comprising a coil of insulated wire and a container in which the said coil is placed, there being within the container a sensibly incompressible fluid that permeates the coil and fills the interstices thereof, portions of the container being flexible and adapted to yield under external pressure, whereby the internal pressure within the container and throughout the coil will be substantially the same as the hydrostatic pressure to which the container is subjected due to being submerged in a liquid.

13. In an inductance loading for submarine cables, comprising a coil of insulated wire and a containing cylindical tank sealed liquid-tight in which the said coil is placed, the tank being filled with a sensibly incompressible fluid that permeates the coil and fills the interstices thereof, the closing ends of the tank being formed of corrugated plates adapted to yield under external pressure due to the submergence of the tank in a liquid and transmit the hydrostatic pressure of such liquid to the fluid within the tank.

14. The combination with a submarine cable, of an inductance loading unit therefor connected therewith, the connection including a ball and socket joint whereby sharp bends in the cable are obviated.

FREDERICK EUGENE PERNOT.
LESTER JACOB RICH.